Patented Nov. 10, 1942

2,301,709

UNITED STATES PATENT OFFICE 2,301,709

RECOVERY OF PURE PHENOLS FROM CRUDE PHENOLS

Carl Rumscheidt and Hinrich Havemann, Leuna, Germany; vested in the Alien Property Custodian No Drawing. Application August 3, 1939, Serial No. 288,142. In Germany August 8, 1938

4 Claims. (Cl. 202—57)

The present invention relates to improvements in the recovery of pure phenols from crude phenols.

In the working up of mineral and brown coal tar oils and also in the purification of phenol-containing waste aqueous liquors from coke-oven, low temperature carbonisation and hydrogenation plants, crude phenols are obtained. These phenols cannot be sufficiently purified by fractional distillation because the contaminating accompanying substances have the same or a similar vapour pressure to that of the phenols themselves. Furthermore in so far as a separation is possible by distillation, the separation of small amounts of impurities necessitates inordinately high distillation costs with a small efficiency of the distillation plant.

It has therefore already been proposed to carry out a purification by chemical means before the distillation. In the purification of crude phenols from mineral coal tar oil and coke-oven waste aqueous liquors, the crude phenols have been successfully treated with caustic soda solution, whereby they are dissolved as phenolates, the impurities, as for example hydrocarbons and bases, which remain undissolved being distilled off with steam. The phenols are then set free again by acidification of the purified alkaline solution with carbon dioxide or sulphuric acid and converted by distillation into a commercial product. The drawbacks to this process are the high costs for chemicals consumed and the necessary voluminous apparatus.

Furthermore the process is not useful for the purification of crude phenols from brown coal tar oils or from waste aqueous liquors from low temperature carbonisation or hydrogenation. Some of the impurities contained in these crude phenols are not removed by the said treatment and impart to the refined phenols properties which exclude their use for many purposes.

It has also been proposed to use sulphuric acid for the purification of crude phenols. In this process, the bases, as for example pyridine bases, are removed, but the other impurities are only partly removed. Even by repeated treatment with sulphuric acid it is impossible to remove the impurities to such an extent that the phenols are well suited for example for the preparation of softening agents for organic film-forming substances, such as cellulose derivatives, polyvinyl compounds, resins from polybasic acids and polyvalent alcohols and the like and for the preparation of tanning agents and high molecular weight condensation products.

We have now found that the impurities can be removed to a far-reaching extent from crude phenols, irrespective of the source from which they are obtained, by acting upon the phenols obtained by treatment with a non-volatile mineral acid, in particular sulphuric acid or phosphoric acid and subsequent distillation, with small amounts of concentrated caustic alkali solutions, if necessary heating for some time and distilling off the phenols from the reaction mixture. In general, for 100 parts by weight of phenol, from about 0.1 to 5 parts of alkali metal hydroxide are used. In this process considerably less caustic alkali is used than is necessary for the conversion of the phenols into phenolates. It is surprising that by the use of small amounts of concentrated caustic alkali solution it is possible, notwithstanding the presence of large amounts of phenol, to bind or convert the impurities so that they no longer pass over in the subsequent distillation, whereas the impurities are not removed when merely washing crude phenols with small amounts of dilute caustic alkali solutions, removing the aqueous solutions containing small amounts of phenolates and distilling the phenols thus treated.

If, however, to the crude phenols such amounts of dilute caustic alkali solutions are added as correspond to about from 0.1 to 5 parts by weight of alkali metal hydroxide for 100 parts of phenol, and subsequently the water is distilled off to a far-reaching degree, pure phenols are also obtained by distilling the mixture.

The following examples will further illustrate the nature of this invention but the invention is not restricted to these examples. The parts are by weight.

Example 1

Crude phenols obtained by the extraction of hydrogenation waste aqueous liquor are distilled in vacuo with an addition of small amounts of sulphuric acid. Phosphoric acid may also be added instead of sulphuric acid. 100 parts of the main fraction have added thereto 0.2 part of sodium hydroxide in the form of a 75 per cent solution and the phenols are distilled off in vacuo. The distillate is colorless and stable to light and yields very pale condensation products by reaction with formaldehyde. By the distillation there are obtained 3.5 parts of a salve-like residue which is solid at room temperature. If the treatment with caustic soda solution be omitted, dark colored condensation products are obtained.

*Example 2*

100 parts of a main fraction of crude phenols obtained as described in Example 1 but from brown coal low temperature carbonisation waste aqueous liquor have added thereto 2.5 parts of sodium hydroxide in the form of a 75 per cent solution, the whole is heated to 100° C. for an hour and the phenols are then distilled off in vacuo. The distillate is colorless and stable to light and dissolves in dilute, for example 7.5 per cent, caustic soda solution giving a pale brown coloration. By distillation there is obtained a residue solid at room temperature in an amount of 10 parts.

What we claim is:

1. The process of producing pure phenols from phenols obtained by treating crude phenols with a non-volatile mineral acid and subsequent distillation, which comprises acting upon the said distilled phenols with a concentrated caustic alkali solution which contains from about 0.1 to about 5 parts by weight of alkali metal hydroxide for 100 parts by weight of phenol, and distilling off the phenols from the reaction mixture.

2. The process of producing pure phenols from phenols obtained by treating crude phenols with a non-volatile mineral acid and subsequent distillation, which comprises adding to the said distilled phenols a dilute caustic alkali solution in an amount corresponding to from about 0.1 to about 5 parts by weight of alkali metal hydroxidle for 100 parts by weight of phenol, evaporating most of the water contained in the solution, and distilling off the phenols from the reaction mixture.

3. In the process as claimed in claim 1 heating the mixture of the phenols with the caustic alkali solution before distilling off the phenols.

4. The process of producing pure phenols from phenols obtained by treating crude phenols with a non-volatile mineral acid and subsequent distillation, which comprises adding to the said distilled phenols a dilute caustic alkali solution in an amount corresponding to from about 0.1 to about 5 parts by weight of alkali metal hydroxide for 100 parts by weight of phenol, heating the mixture of the phenols with the caustic alkali solution and distilling off the phenols.

CARL RUMSCHEIDT.
HINRICH HAVEMANN.